United States Patent
Wang et al.

(10) Patent No.: US 7,800,531 B2
(45) Date of Patent: Sep. 21, 2010

(54) HIGH PRECISION POSITIONING SYSTEM

(75) Inventors: Yi-Hsiu Wang, Santa Clara, CA (US); Qinfang Sun, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 286 days.

(21) Appl. No.: 12/043,853

(22) Filed: Mar. 6, 2008

(65) Prior Publication Data
US 2009/0224967 A1  Sep. 10, 2009

(51) Int. Cl.
*G01S 19/42* (2010.01)
*G01S 19/31* (2010.01)

(52) U.S. Cl. .............................. 342/357.25; 342/357.71

(58) Field of Classification Search ............ 342/357.06, 342/357.1, 357.12, 357.15; 701/213, 215
See application file for complete search history.

(56) References Cited

U.S. PATENT DOCUMENTS 5,943,606 A * 8/1999 Kremm et al. ............. 455/12.1
2006/0095206 A1 * 5/2006 Garin et al. ................ 701/213
2007/0041427 A1 * 2/2007 Small ........................ 375/145

* cited by examiner

*Primary Examiner*—Dao L Phan
(74) *Attorney, Agent, or Firm*—Bay Area Technology Law Group PC

(57) ABSTRACT

A method for determining a position uses an access point array, a reference station, a location server and a client terminal. The reference station may include a GPS receiver to acquire and track GPS satellites. GPS data may be provided to the location server. The access point array may be configured to minimize interference and may be coupled by a network to the location server. The client terminal may include a GPS receiver. A frequency offset for the client terminal may be determined by examining a frequency offset of the reference station and relative offset frequencies of the access points. This frequency offset may advantageously increase the sensitivity of the client terminal to GPS signals. The client terminal may provide GPS data to the location server, which server may determine the position of the client terminal based on data from the client terminal and the reference station.

26 Claims, 2 Drawing Sheets

HIGH PRECISION POSITIONING SYSTEM

BACKGROUND OF THE INVENTION

1. Field of the Invention

Embodiments of the specification generally relate to a positioning system, and more particularly to a high precision positioning system.

2. Description of the Related Art

Global positioning system (GPS) receivers typically use data from four or more orbiting GPS satellites to determine navigational information such as position and velocity. GPS satellites use relatively low power radio transmitters. For example, a typical GPS satellite may only be rated to 50 W. A typical orbit of a GPS satellite is approximately 14,500 miles above Earth. At that distance, the signal strength of a GPS signal on Earth may be as low as −160 dBW. Since the GPS signals are relatively weak, receiving GPS signals indoors may be difficult since weak signals may not be able to completely penetrate the roof and walls of buildings, increasing the difficultly of determining a relatively accurate position.

Outdoors, with an unobstructed view of the sky, commercial GPS receivers can generally resolve a position to an accuracy of between five to ten meters. Relatively higher resolution (i.e., resolving a position to an accuracy of much less than one meter) may not be possible with commercial GPS receivers. Moreover, resolving the position of a partially occluded GPS receiver, such as a GPS receiver located indoors may not be possible without the aid of GPS pseudolites.

Therefore, what is needed in the art is a method for determining a relatively accurate position in an environment with diminished GPS signal reception.

SUMMARY OF THE INVENTION

A method for determining a position of a device is presented. In one embodiment, the device may include a GPS receiver, and may operate within a bounding volume that may include a plurality of wireless access points (WAPs). The frequency offset between the GPS receiver and a GPS transmitter may be determined by examining one or more relative frequency offsets. The frequency offset may be used to guide the acquisition of a GPS signal. The signal strength of a first WAP may be measured at the device. The position of the device may be determined by examining the measured signal strength and GPS data from the acquired GPS signal.

A relative frequency offset may describe a frequency difference between a first and a second local oscillator. In one embodiment, the relative frequency offsets may describe the frequency difference between two WAP oscillators or between oscillators within a WAP and a GPS receiver.

In an alternative embodiment, a plurality of signal strength measurements from multiple WAPs may be used to determine the device position. In addition, the position of the WAPs may be surveyed so that the signal strength measurements may be used to locate the device within the bounding volume.

A high precision positioning system is presented. The system may include a reference station, a location server, a volume bounding one or more WAPs and a client terminal. The reference station may include a GPS receiver, and may be configured to determine a first frequency offset between the GPS receiver and a GPS transmitter. A first WAP may be configured to determine a relative frequency offset between the first WAP and the GPS receiver included in the reference station. The client terminal may determine a second relative frequency offset between an oscillator within the client terminal and the first WAP. In one embodiment, the first frequency offset and the relative frequency offsets may be stored in the location server. The location server may determine a second frequency offset between the client terminal and a GPS transmitter and may provide that offset to the client terminal. The client terminal may use the second frequency offset to guide GPS signal acquisition. Data from the acquired GPS signal may be provided to the location server. The location server may examine the provided GPS data and determine the location of the client terminal.

In one embodiment, the signal strength of one or more WAPs may be measured at the client terminal and provided to the location server. The location of the WAPs may be surveyed to determine the relationship of the WAPs to the bounding volume. The location server may determine the position of the client terminal using signal strength information and GPS data.

DETAILED DESCRIPTION

Figure 1:
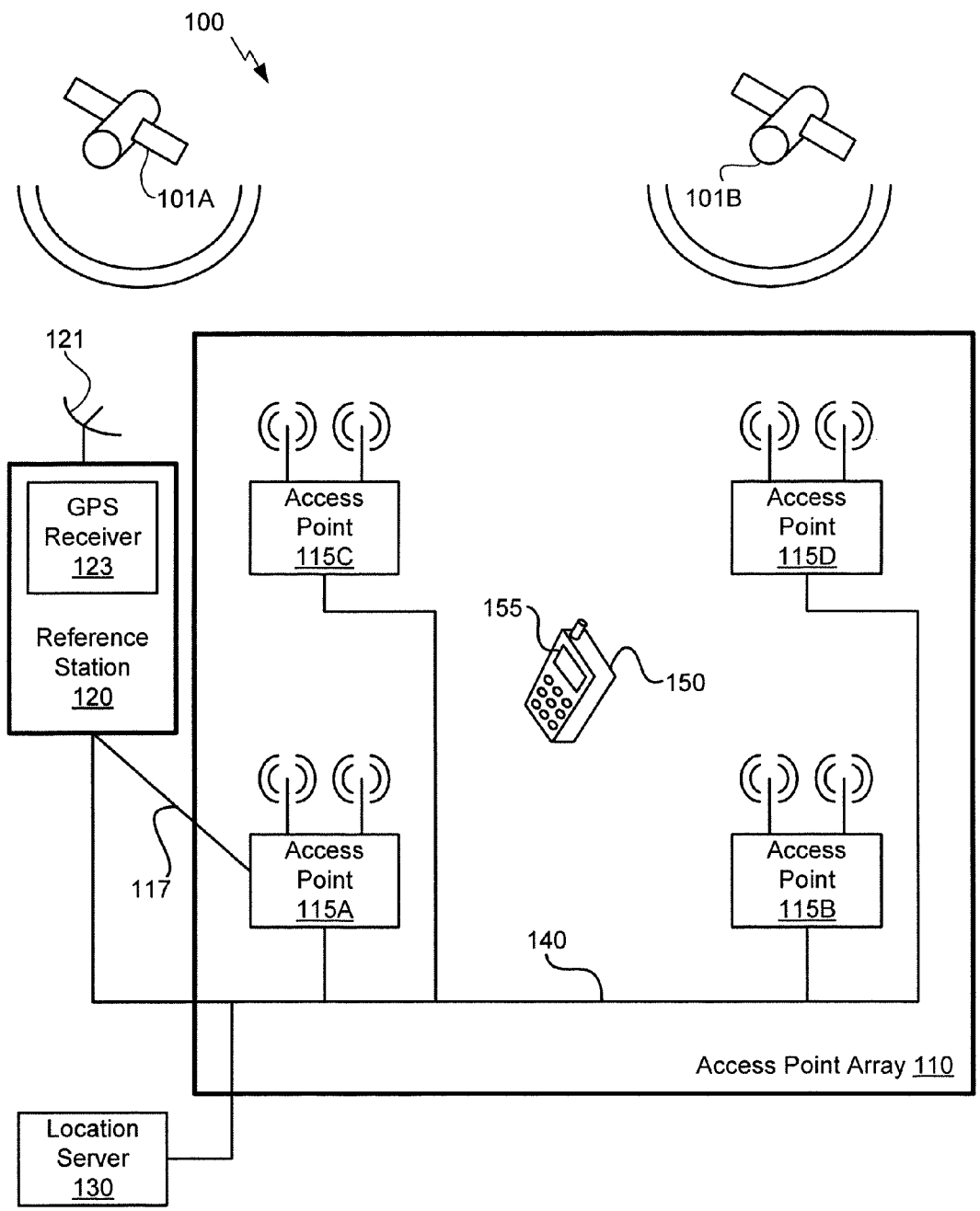
FIG. 1 is a diagram of a high precision positioning (HiPP) system.

FIG. 1 is a diagram of a high precision positioning (HiPP) system 100. The HiPP system 100 may include a reference station 120, an access point array 110, a network 140, a location server 130, and a client terminal 150. The access point array (hereinafter referred to as "the array") 110 may include one or more access points. The exemplary array 110 includes four access points 115A, 115B, 115C, and 115D. Typically, the array 110 may be located indoors.

The access points 115A, 115B, 115C and 115D are coupled to the network 140. In one embodiment, the access points 115A, 115B, 115C and 115D may be wireless access points that may support one or more of the IEEE 802.11 body of standards. The network 140 couples access points 115A-115D to the location server 130 and the reference station 120. At least one of the access points 115A-115D within the array 110 may be coupled to the reference station 120. In this exemplary embodiment, access point 115A is coupled to the reference station 120 though a coupling 117. The reference station 120 includes a GPS receiver 123 and an antenna 121. While the reference station 120 may be located indoors, the antenna 121 may be positioned either indoors or outdoors such that the antenna 121 may have a relatively clear view of the sky. In one embodiment, the antenna 121 may be an external antenna coupled to the GPS receiver 123.

The antenna 121 may receive GPS signals from one or more GPS satellites. The number of GPS satellites that are within view of the antenna 121 may depend on factors such as actual view of the sky, time of day, global position, etc. Only two GPS satellites 101A and 101B are shown here for clarity. The antenna 121 provides GPS signals to the GPS receiver 123.

As is well-known, a GPS receiver, such as GPS receiver 123, may determine which GPS satellites are within view of the GPS receiver 123. Each GPS satellite transmits a GPS signal that may include a unique coarse acquisition (CA) code, which is a continually repeating, pseudo-random number sequence of 1,023 "chips". By determining which CA codes are being received, as well as the CA code phase (i.e., the position within the repeating CA code sequence), a GPS receiver may determine the GPS satellites that are in view.

After CA codes and related code phases are determined, other GPS data, such as ephemeris data, may be recovered from the GPS signals. The GPS data may be processed to determine a first position.

To determine which CA codes are being received, the GPS receiver 123 typically determines a first frequency offset ($\Delta F_1$) between a local oscillator (i.e., an oscillator within the GPS receiver 123) and a transmitter oscillator (i.e., an oscillator within the GPS satellite). Until the first frequency offset $\Delta F_1$ is determined, the GPS receiver 123 may require relatively more time to search possible frequencies (e.g., Doppler frequencies) to determine received CA codes.

The reference station 120 is coupled to the location server 130 through the network 140, and may store the first frequency offset $\Delta F_1$ in the location server 130. Current GPS signal information, such as received CA codes, related code phases, and received ephemeris data may also be stored in the location server 130.

Since the reference station 120 is stationary, the GPS receiver 123 may refine the first position by continually processing GPS signals. For example, there may be no frequency offsets due to motion of the GPS receiver 123; frequency offsets may be caused by, to some extent, Doppler effects and the first frequency offset $\Delta F_1$ described above. In one embodiment, the first position may be refined by averaging determined position solutions over time. For example, a determined position may be averaged for a period as small as a few minutes to a period as long as a few hours. In one embodiment, the first frequency offset $\Delta F_1$ may also be refined over time. A GPS error correction value may be determined that may describe the difference between the first position and the refined position. The GPS error correction value may be stored in the location server 130.

It is interesting to note that the GPS receiver 123 is used to determine GPS signal information and a GPS error correction value. While a position is determined by the GPS receiver 123, the position is not used except for determining the GPS error correction value. Thus, the antenna 121 should be reasonably proximate to the array 110, but there may be a great deal of flexibility with regard to the exact placement. As is described in greater detail below, the antenna 121 should have the same GPS satellites in view that are generally visible to the array 110.

The array 110 may be configured for use within the HiPP system 100. One aspect of the array 110 that may be configured is access point arrangement. In one embodiment, the access points 115A-115D may be arranged in a grid-like pattern where the distance between adjacent access points may be about ten meters. Also, transmit powers of the access points 115A-115D may be configured to reduce interference. For example, while a typical wireless access point may transmit a signal that may reach an area included by a 100 meter radius, the access points 115A-115D within the array 110 may be configured such that their respective transmit powers reach a relatively smaller area. In one embodiment, each access point may be configured to transmit a signal to reach an area of approximately ten meters in radius around the access point by, among other things, reducing transmit power of the respective access point and examining the receive signal strength indication (RSSI) observed at one or more access points in the array 110. For example, access point 115A may store the RSSI of a signal transmitted by access point 115B in the location server 130. The location server 130 may direct the access point 115B to adjust its output power in response to the stored RSSI. In another embodiment, the area covered by an access point may slightly overlap areas covered by adjacent access points. In other embodiments, the spacing between access points may differ from exemplary ten meters described above. If the spacing is less than ten meters, then relatively finer grained power measurement may be made.

Another aspect of the array 110 that may be configured is a physical relationship between the access points 115A-115D and the array 110. The physical relationship may be defined by surveying the placement of the access points 115A-115D in the array 110. In one embodiment, the access points 15A-115D may be surveyed by establishing the position of each access point with respect to the array 100. For example, the boundaries of the array 110 may be defined with respect to external coordinates, such as GPS coordinates. In one embodiment, the boundaries of the array 110 may be determined by a plurality of GPS measurements made along array 110 boundaries. The position of the access points within the array 110 may be determined with respect to the boundaries of the array 110. For example, the position of each access point may be determined by measuring distances between access points and the determined array 110 boundaries. Thus, the position of the access points also may be determined with respect to external coordinates. The survey information may be stored in the location server 130.

The configuration of the array 110 may also include determining access point channel usage. In one embodiment, wireless channels used by the access points also may be configured to reduce interference between other access points within the array 110. For example, access point 115A may be configured to use channel 1 while access point 115B may be configured to use channel 6 where such channels may be defined by standards, such as the IEEE 802.11 family of standards.

The first frequency offset $\Delta F_1$, as described above, may determine the frequency offset between the local oscillator included in the GPS receiver 123, and an oscillator within a GPS satellite. Relative frequency offsets ($\Delta f_1$) may be determined between local oscillators in the access points 115A-115D and the local oscillator in the GPS receiver 123. The relative frequency offsets used in conjunction with the first frequency offset $\Delta F_1$ may aid in the acquisition of GPS signals, particularly when the signal strength of the GPS signals may be diminished, such as indoors. This is described in detail below.

Wireless access points may include local oscillators for transmitting and receiving communication data. The access point 115A may determine a first relative frequency offset $\Delta f_1$ between the local oscillator within the access point 115A and the local oscillator within the GPS receiver 123 using coupling 117. The coupling 117 may carry frequency information related to the local oscillator in the GPS receiver 123. In one embodiment, the coupling 117 may be provided by a physical connection, such as copper twisted pair. In another embodiment, the coupling 117 may be provided by a wireless link. The first relative frequency offset $\Delta f_1$ may be stored in the location server 130.

After determining the first relative frequency offset $\Delta f_1$ of access point 115A, the relative frequency offsets of the remaining access points within the array 110 may be determined. As is well-known, relative frequency offsets may be determined by examining transmitted signals, such as beacons. The precise order in which the remaining relative frequency offsets $\Delta f_1$ are determined is not important. For example, a second relative frequency offset $\Delta f_2$ of access point 115B may be determined with respect to the local oscillator included in access point 115A. In a similar manner, the relative frequency offsets of the local oscillators within the other access points in array 110 may be determined. The relative frequency offsets $\Delta f_2$-$\Delta f_4$ related to access points 115B-115D may be stored in the location server 130.

The client terminal 150 may be located within the array 110. The client terminal 150 may include a wireless communication transceiver enabling data transfer between access points 115A-115D within the array 110. In one embodiment, the client terminal may also include a GPS receiver 155.

The client terminal 150 may receive communication data, such as beacon data from access points. The client terminal 150 may not receive communication data from every access point in the array 110, but rather from access points with transmit signal power sufficient to reach the client terminal 150. The client terminal 150 may determine the signal strength of the received access point communication data. In one embodiment, the client terminal may use RSSI to determine receive signal strength.

The client terminal 150 may determine a relative frequency offset ($\Delta f_{CT}$) between a local oscillator in the client terminal 150 and a local oscillator in an access point 115A-115D. The client terminal 150 may not determine the relative frequency offset $\Delta f_{CT}$ between the client terminal 150 local oscillator and all the access points within the array 110, but rather between access points with transmit power sufficient to reach the client terminal 150.

The client terminal 150 sends receive signal strength information and the relative frequency offset $\Delta f_{CT}$ to the location server 130. For example, the client terminal 150 may send data through an access point 115A-115D and the network 140 to the location server 130.

The location server 130 receives the signal strength information from the client terminal 150. The location server 150 may send current GPS satellite information, such as current satellites in view, current CA codes and related code phases, to the client terminal 150. As described herein, current GPS satellite information may be stored in the location server 130 by the GPS receiver 123.

The location server 130 may determine a second frequency offset ($\Delta F_2$) between a local oscillator in the client terminal 150 and a GPS satellite. The second frequency offset $\Delta F_2$ may be determined by examining the relative frequency offset of the client terminal 150 ($\Delta f_{CT}$) and one or more of the relative frequency offsets of the access points 115A-115D (i.e. $\Delta f_1$-$\Delta f_4$). For example, assume the client terminal is receiving a signal from access point 115A. If the relative frequency offset between the client terminal 150 and access point 115A is $\Delta f_{CT}$ and the relative offset between access point 115A and the GPS receiver 123 is $\Delta f_1$, and the first frequency offset between the GPS receiver 123 and a selected GPS satellite is $\Delta F_1$, then the second frequency offset $\Delta F_2$ between the client terminal 150 and the selected GPS satellite may be $\Delta f_{CT} + \Delta f_1 + \Delta F_1$.

If the relative frequency offset $\Delta f_{CT}$ of the client terminal 150 is determined with respect to an access point with a relative frequency offset not directly related to the GPS receiver 123, then the intervening relative frequency offsets may be used to determine the second frequency offset $\Delta F_2$. For example, assume that the client terminal 150 is receiving a signal from access point 115B. If $\Delta f_{CT}$ is determined with respect to access point 115B with a respective relative frequency offset of $\Delta f_2$ that has been determined with respect to access point 115A with a respective relative frequency offset $\Delta f_1$ determined with respect to the GPS receiver 123, then the second frequency offset $\Delta F_2$ of the client terminal 150 may be $\Delta f_{CT} + \Delta f_1 + \Delta f_2 + \Delta F_1$.

The second frequency offset $\Delta F_2$ may advantageously increase the sensitivity to relatively lower strength GPS signals, such as GPS signals found indoors, by reducing the range of frequencies that the GPS receiver 155 in the client terminal 150 may search before acquiring a GPS signal from a GPS satellite. As such, one or more of the frequency offsets described herein guides the GPS receiver 155 in acquiring the GPS signals, either by using the frequency offsets to find the GPS signals, or by assisting the GPS receiver 155 in finding or processing the GPS signals.

After the GPS receiver 155 in the client terminal 150 acquires one or more GPS satellites, the client terminal 150 may send GPS data, such as acquired CA codes and related code phases, to the location server 130. The location server 130 may determine the position of the client terminal 150 by analyzing the received GPS data and signal strength information as well as ephemeris data and the GPS error correction value provided by the reference station 120. This position can be made available to the client terminal 150 or to a software application.

While a traditional GPS fix may only be accurate to within five to ten meters, the HiPP system 100 may provide a relatively more precise fix by using the error correction value and the receive signal strength information to refine the position of the client terminal 150. For example, the receive signal strength information may be used to determine the proximity of the client terminal 150 to one or more access points 115A-115D in the array 110. Since the access points 115A-115D have been surveyed, the position of the client terminal 150 in the array 110 may, to some extent, be determined by examining the receive signal strength information. In some embodiments, using GPS data, received signal strength information and error correction values may provide a position accurate to less than one meter.

The HiPP system 100 may advantageously determine a relatively accurate position of the client terminal 150. In some embodiments, two or more client terminals may be used in the array 110. The position of the reference station 120 and the antenna 121 is advantageously not critical with respect to the array 110. The reference station 120 may provide frequency offset information, CA code information and ephemeris data to the location server 130 to increase the client terminals 150 sensitivity to GPS signals, and not necessary determine the position of the array 110. Moreover, since the location server 130 determines the position of the client terminal 150, the design of the client terminal 150 may be relatively simple since position computations may be performed by the location server 130.

In an alternative embodiment, the location server 130 may provide the client terminal 150 GPS data from the reference station 120 and array configuration information describing the position of the access points 115A-115D in the array. In this embodiment, the client terminal 150 may determine its position by examining receive signal strength information and GPS data from the GPS receiver 155. Although the design of the client terminal 150 may not be as simple as described in the above embodiment, network traffic may be advantageously reduced. Additionally, the client terminal 150 may host a software application, such as a mapping program designed to show a user the position of the client terminal. In such an embodiment, software latency may be reduced since less the client terminal position may be determined locally.

The foregoing describes the determination of the second frequency offset $\Delta F_2$ of the client terminal 150 with respect to a particular GPS satellite. Since more than one GPS satellite may be within view of the antenna 121, other frequency offsets related to other GPS satellites may be determined in a similar manner.

In another embodiment, the access points 115A-115D may include GPS receivers. Thus, the configuration of the array 110 may be simplified. The GPS receivers in the access points may determine the position of each access point and the determined position may be stored in the location server 130. Thus, the relationship between access points and the array may be determined by location server 130, which may ease the surveying of the access points 115A-115D.

Figure 2:
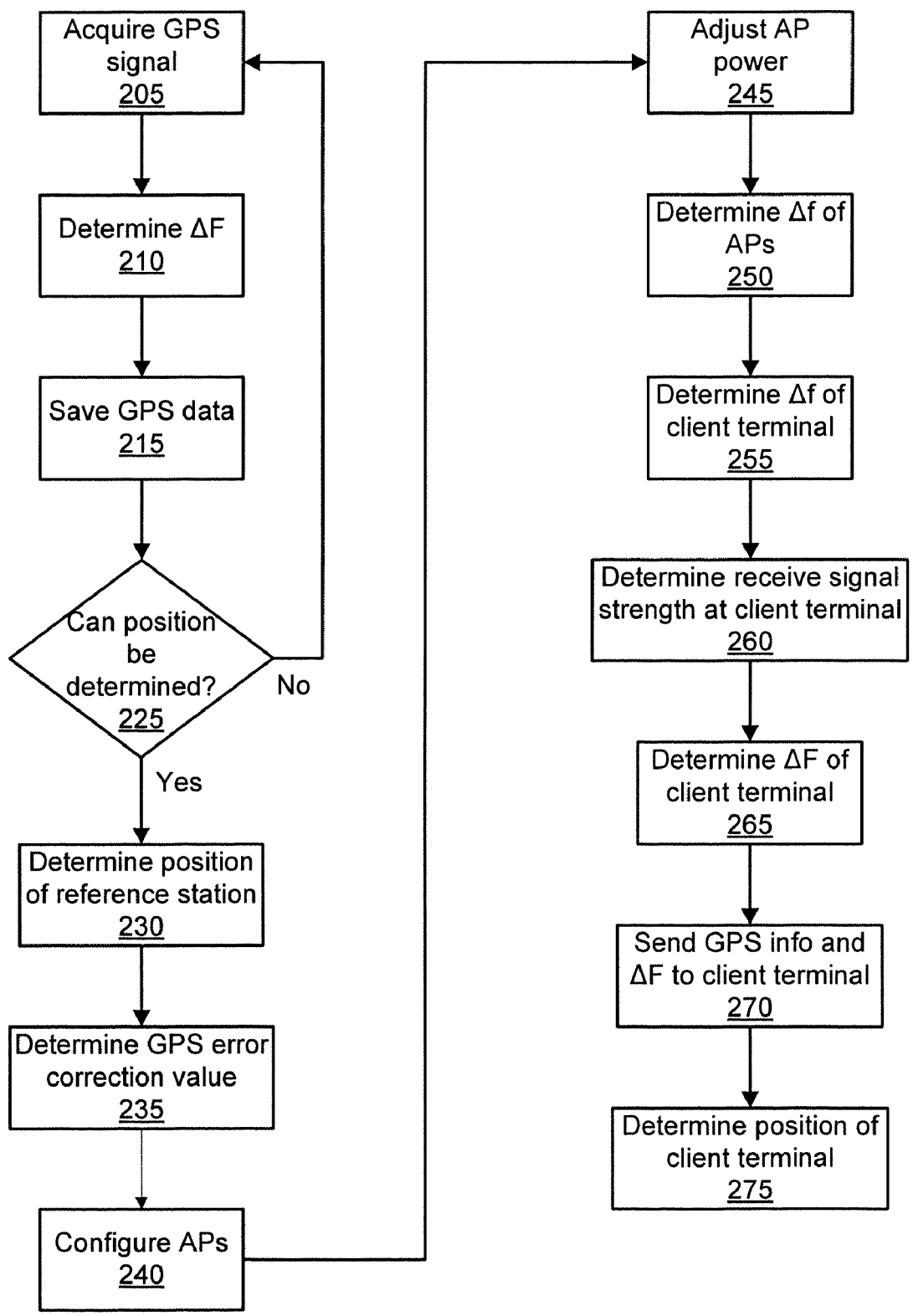
FIG. 2 is a flowchart of method steps for determining a client terminal position.

FIG. 2 is a flowchart of method steps for determining a client terminal 150 position. Persons skilled in the art will recognize that any system configured to perform the method steps in any order is within the scope of the specification.

The method begins as step 205 acquires a GPS signal from a GPS satellite. The acquisition of a GPS signal may enable the determination of GPS data such as, but not limited to, related CA code and code phase of the GPS signal. Next, step 210 determines a first frequency offset $\Delta F_1$. As described herein, the first frequency offset $\Delta F_1$ may describe the frequency difference between an oscillator in the GPS receiver 123 and an oscillator in a GPS satellite. Subsequently, step 215 saves the GPS data and the first frequency offset $\Delta F_1$ in the location server 130.

Step 225 examines the GPS data and determines if there is sufficient GPS data to determine a first position. If insufficient GPS data has been collected, then the method returns to step 205. If, on the other hand, there is enough GPS data, then step 230 determines the first position of the GPS receiver 123.

Next, step 235 determines a GPS error correction value as described herein. In one embodiment, the GPS error correction value may be determined by comparing the first position of the GPS receiver 123 to a position determined by averaging determined GPS positions.

Then, step 240 configures access points 115A-115D within the array 110. As described herein, the access points 115A-115D may be arranged on a grid approximately ten meters apart. Access point configuration may include surveying the access points 115A-115D and the resulting survey information may be stored in the location server 130. Step 245 adjusts the transmit power of the access points 115A-115D to reduce interference between access points in the array 110.

The method continues as step 250 determines the relative offset frequencies $\Delta f_1$-$\Delta f_4$ of the access points 115A-115D. Relative offset frequencies may be determined as described herein and stored in the location server 130. Step 255 determines the relative offset $\Delta f_{CT}$ of the client terminal 150. The relative frequency offset $\Delta f_{CT}$ may be determined as described herein and stored in the location server 130. Step 260 determines the receive signal strength of access point signals at the client terminal 150. The receive signal strength information may be provided to the location server 130.

Next, step 265 determines the second frequency offset $\Delta F_2$ of the client terminal 150. As described herein, the second frequency offset $\Delta F_2$ may be determined by examining one or more of the relative frequency offsets of the access points 115A-115D and the relative frequency offset of the client terminal 150. Step 270 provides GPS data and the second frequency offset $\Delta F_2$ to the client terminal 150. Step 275 determines the position of the client terminal 130. In one embodiment, the client terminal 150 may use the second frequency offset $\Delta F_2$ and GPS data provided from the location server 130 to acquire one or more GPS satellites. GPS data, such as CA codes and related code phases, acquired by the client terminal 150 may be sent to the location server 130. The location server 130 may determine the position of the client terminal 150 by examining data provided by the reference station 120 and the client terminal 150.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent.

For example, GPS receivers and GPS satellites are used in the description of FIGS. 1 and 2. Other embodiments may use other Global Navigation Satellite Systems (GNSS) such as the Russian GLONASS or the European Galileo System.

Accordingly, it is intended that the scope of the invention be defined by the following Claims and their equivalents.

The invention claimed is:

1. A method for determining a position of a device including a GPS receiver within a spatial volume bounding a plurality of wireless access points (WAPs), the method comprising:
   determining a first frequency offset of the GPS receiver based on one or more relative frequency offsets;
   acquiring a first GPS signal at the GPS receiver, wherein the first frequency offset guides the acquisition of the first GPS signal; and
   measuring a signal strength of a first WAP at the device, wherein the signal strength measurement and the first GPS signal are used to determine the device's position.

2. The method of claim 1, further comprising:
   measuring a second signal strength of a second WAP, wherein the signal strength and the second signal strength measurements and the first GPS signal are used to determine the device position.

3. The method of claim 2, wherein the plurality of WAPs is configured by spatially separating the WAPs.

4. The method of claim 3, wherein the plurality of WAPs is further configured by adjusting a transmit power of the plurality of WAPs.

5. The method of claim 2, wherein the plurality of WAPs is further configured by selecting at least one wireless channel of the plurality of WAPs to reduce interference between adjacent WAPs.

6. The method of claim 3, wherein the plurality of WAPs is further configured by surveying the WAPs.

7. The method of claim 1, further comprising:
   determining a GPS error correction value, wherein the GPS error correction value is used in determining the device position.

8. A method for determining a position of a device including a GPS receiver within a spatial volume bounding a plurality of WAPs, the method comprising:
   determining a first frequency offset of the GPS receiver based on one or more relative frequency offsets;
   acquiring a first GPS signal, wherein the first frequency offset guides the acquisition;
   exporting WAP survey information to a device; and
   measuring the signal strength of one or more WAPs at the device, wherein the signal strength measurement and the GPS data from the first GPS signal are used to determine a device position.

9. The method of claim 8, wherein the WAP survey information is determined by at least one GPS receiver.

10. The method of claim 8, wherein at least one WAP in the plurality of WAPs includes a GPS receiver.

11. A method for determining a position of a first GPS receiver, the method comprising:
    determining a first frequency offset of a first GPS receiver based on one or more relative frequency offsets between WAPs;
    acquiring a first GPS signal, wherein the first frequency offset guides acquisition of the first GPS signal;
    exporting WAP survey information to a device; and determining a position of the first GPS receiver based upon GPS data from the first GPS signal and the WAP survey information.

12. The method of claim 11, wherein the first frequency offset is further determined by a second frequency offset between a second GPS receiver and the first GPS signal.

13. The method of claim 12, further comprising acquiring a second GPS signal, wherein a third frequency offset guides the acquisition for the second GPS signal.

14. The method of claim 13, wherein the third frequency offset is determined by the one or more relative frequency offsets between WAPs.

15. A system for determining a position of a client terminal, comprising:
- a reference station including a GPS receiver configured to determine a first frequency offset between the GPS receiver and a GPS signal;
- a spatial volume bounding a first WAP configured to determine a first relative frequency offset between the first WAP and the reference station;
- a client terminal configured to determine a second relative frequency offset between the client terminal and the first WAP; and
- a location server configured to determine a second frequency offset based on the first and second relative frequency offsets, wherein the position of the client terminal is determined using at least the first frequency offset and the second frequency offset.

16. The system of claim 15, wherein the client terminal is further configured to acquire the GPS signal using the second frequency offset.

17. The system of claim 16, wherein the location server is configured to determine a position of the client terminal using GPS data from the client terminal.

18. The system of claim 17, wherein the spatial volume is further configured by surveying the first WAP.

19. The system of claim 18, wherein the client terminal is further configured to measure the signal strength of the first WAP.

20. The system of claim 15, wherein the reference station is further configured to determine a GPS error correction value.

21. The system of claim 15, wherein the bounded volume of WAPs includes a second WAP.

22. The system of claim 21, wherein the WAPs in the bounded volume are further configured to reduce interference.

23. The system of claim 22, wherein the configuration of the WAPs is selected from the group consisting of adjusting transmit power and selecting wireless channels.

24. The system of claim 21, wherein the bounded volume of WAPs is further configured by surveying the position of the WAPs.

25. The system of claim 21, wherein the WAPs include GPS receivers configured to determine a position of the WAPs.

26. The system of claim 22, wherein the second WAP determines a third relative frequency offset between the first WAP and the second WAP.

* * * * *